3,822,314
PROCESS FOR THE PREPARATION OF
NITROXIMES AND NITROKETONES
Michel Gay, Lyon, and Michel Houde, Oullins, France,
assignors to Rhone-Poulenc SA, Paris, France
No Drawing. Filed July 22, 1970, Ser. No. 57,304
Claims priority, application France, July 23, 1969,
6925146
Int. Cl. C07c 131/00
U.S. Cl. 260—566 A          6 Claims

ABSTRACT OF THE DISCLOSURE

Nitroximes, which can be hydrolysed to nitroketones, are made by the nitrosation of vinyl-benzenes in a reaction medium comprising water and an organic solvent at least partially soluble therein.

---

The present invention relates to the preparation of nitroximes and nitroketones.

Nitroximes have been prepared in two stages from olefinic compounds such as styrene [see Wieland Ber. 36 2558-67 (1903), and Klaman et al. Ber. 98 1831-6 (1965)]. During the first stage, a pseudonitrosite is prepared at a low temperature by reaction of a gas containing nitrogen oxides with styrene in a solvent (e.g. ether, acetic acid, or an ether/benzene mixture). In a second stage, this pseudo-nitrosite, which may be dimerised, is heated either in ethanol (Wieland) or in an aprotic and strongly polar solvent (Klaman).

The present invention provides a process for the preparation of nitroximes of the formula:

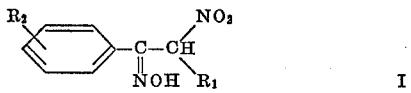

in which the symbol $R_1$ is a hydrogen atom, a hydrocarbon radical, a heterocyclic radical or a nitrile radical, a hydroxycarbonyl or hydroxysulphonyl radical, or a functional derivative thereof, and the symbol $R_2$, which may be the same as $R_1$ or different, can also be a halogen atom or an alkoxy, aryloxy or nitro radical, which comprises nitrosating a compound of the formula:

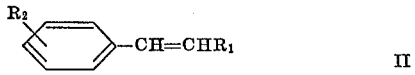

in a reaction medium containing water and a solvent at least partially soluble in water, which is a ketone, nitrile, ether, alcohol, sulphoxide, N-alkylated amide, ester, or nitroaliphatic hydrocarbon.

The nitroximes of formula I may be hydrolysed without isolation to produce the nitroketones of the formula:

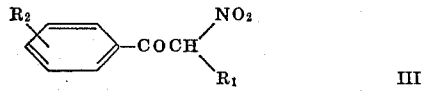

in which $R_1$ and $R_2$ are as hereinbefore defined.

More precisely, the symbols $R_1$ and $R_2$ can represent alkyl, cycloalkyl, aryl, aralkyl, pyridyl, thienyl, thenyl and furyl radicals; the functional derivatives of the hydroxycarbonyl and hydroxysulphonyl groups are more particularly esters and amides. Preferably $R_1$ is hydrogen or alkyl of 1 to 4 carbon atoms, and $R_2$ is hydrogen, halogen, nitro, cyano, alkyl of 1 to 4 carbon atoms, or alkoxy of 1 to 4 carbon atoms.

By a solvent which is at least partially soluble in water, there is to be understood a compound which is soluble in water to the extent of more than 5% by weight and preferably more than 10%. The solvent used in the new process may be, for example, a dialkylketone of 1 to 4 carbon atoms in each alkyl, an alkano-nitrile of 2 to 5 carbon atoms, an alkanol of 1 to 6 carbon atoms, a dialkyl ether of 1 to 4 carbon atoms in each alkyl, a dialkyl sulphoxide of 1 to 4 carbon atoms in each alkyl, an N,N-dialkyl alkanoamide of 1 to 4 carbon atoms in each alkyl and in the alkanoic residue, an alkyl alkanoate of 1 to 4 carbon atoms in each alkyl and alkanoic residue, a nitro-alkane of 1 to 4 carbon atoms, a hexa-alkylphosphotriamide of 1 to 4 carbons in each alkyl, an ethylene glycol mono- or di-alkyl ether of 1 to 4 carbons in each alkyl, p-dioxane, or tetrahydrofuran.

The proportion of water in the mixture of water and solvent is usually between 5 and 80% by weight, and preferably between 30 and 65%.

The nitrosation agent may be nitrogen sesquioxide $N_2O_3$, or another nitrosation agent, which may be prepared in situ or separately. Thus, it is possible to use nitrous acid, mixtures of nitrogen monoxide and nitrogen dioxide in which the molar ratio of monoxide/dioxide is at least equal to 1, and mixtures of oxygen and nitrogen monoxide in which the molar proportion of monoxide/oxygen is at least equal to 4. A convenient method of nitrosation consists of employing nitrous acid prepared in situ by the action of an acid on an alkali metal nitrite. This method of working is used if the radicals $R_1$ and $R_2$ cannot be hydrolysed under these conditions. An acid is chosen of which the pK and the concentration in the reaction medium are such that the pH of the medium is lowered to a value below the pK of nitrous acid.

When the process is effected with $N_2O_3$, it is theoretically sufficient to use an amount thereof equal to, or greater than, 1 mol for each mol of compound of formula II to be converted into 1 mol of nitroxime of formula I. If other, equivalent, notrosation agents are employed, the amount thereof is adjusted so as to correspond to the nitrogen sesquioxide formed.

The proportion by weight of the compound of formula II in the total reaction mixture is generally between 0.5 and 40%; and is preferably between 3 and 10%.

The process of the invention is generally carried out at a temperature between —20 and +50° C. and preferably at —5° to +30° C. It is usually carried out at atmospheric pressure but it is also possible to operate at a pressure below or above atmospheric pressure; the use of a pressure above atmospheric pressure has a favourable effect on the reaction speed.

The process of the invention can be carired out continuously or discontinuously.

If the process is carried out discontinuously with nitrous acid prepared in situ, the following two methods of working can especially be used:

(a) In the first method, a mixture of compounds of formula II, oragnic solvent, sodium nitrite and water is prepared. A strong inorganic acid is then gradually introduced into this mixture.

(b) In the second working method, a mixture comprising the compound of formula II, an organic solvent, a strong inorganic acid and water is prepared. Sodium nitrite, preferably in aqueous solution, for example a saturated aqueous solution, is then gradually introduced into this mixture.

In all these cases, the nitroxime can be isolated from the reaction medium, when the reaction is finished, by any known method, for example by distillation of the organic solvent followed by filtration or by extraction with an appropriate solvent. It is also possible not to isolate the nitroxime and to employ the reaction mixture directly in a subsequent reaction, optionally after having removed the organic solvent by distillation.

The nitroximes of formula I can be used to increase the cetane number of Diesel engine fuels.

They can also be used as synthetic intermediates in organic chemistry and especially for the preparation of nitroketones of formula III. This preparation is generally carried out by hydrolysis by any known method, preferably by heating in the presence of a strong inorganic acid such as sulphuric acid or hydrochloric acid. Oxygen-containing nitrogen derivatives, especially nitrous acid, generally give rise to degradation reactions at the temperatures at which the hydrolysis is carried out. Consequently it is advantageous to remove these oxygen-containing nitrogen derivatives before carrying out the hydrolysis. If the final reaction mixture originating from the reaction of the compound of formula II with nitrogen sesquioxide, or its equivalent, contains a strong inorganic acid, it suffices, for preparing the nitroketone of formula III to heat this reaction mixture to a temperature above 50° C., preferably between 75 and 100° C.

It is furthermore possible to prepare the nitroketones of formula III continuously from compounds of formula I without isolating the nitroximes. For this, a reactor is used which comprises a low temperature zone, a high temperature zone and an acid feed, either at the start or at the end of the low temperature zone. During its passage through this low temperature zone the nitroxime is formed in the reaction mixture and the nitroxime is converted into the nitroketone during passage through the high temperature zone.

The nitroketones of formula III are valuable organic synthesis intermediates, especially because of the number of reacitve groupings present in the molecule.

The following Examples illustrate the invention and show how it can be put into practice.

EXAMPLE 1

10.4 g. of styrene, 68 g. of water, 120 g. of acetone and 12 g. of sulphuric acid (66° Baumé) are introduced into a 500 cm.³ flask equipped with a stirrer, a thermometer and a dropping funnel. The mixture is cooled to 0° C., and a solution containing 13.8 g. of sodium nitrite dissolved in 38 g. of water is then gradually introduced over the course of 1 hour while this temperature is maintained. The reaction mixture is then allowed to return to about 20° C., and the acetone is removed by vacuum distillation, which causes the oxime of ω-nitroacetophenone to precipitate. The mixture is filtered and the product is dried to constant weight at about 20° C. in vacuo.

14.6 g. of ω-nitroacetophenone oxime, of formula

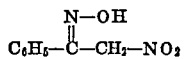

and of melting point 95° C. are thus obtained.

This oxime is mixed with 144 g. of 25% by weight sulphuric acid. The mixture is heated to 85° C. for 1 hour with stirring and is cooled and filtered. 12.7 g. of ω-nitroacetophenone are thus obtained. After recrystallation from ethanol, the ω-nitroacetophenone shows a melting point of 107° C.

EXAMPLE 2

20.8 g. of styrene, 27.6 g. of sodium nitrite, 150 g. of water and 200 g. of acetonitrile are introduced into the apparatus described in Example 1. The mixture is cooled to 0° C. and 82.3 g. of 25% by weight sulphuric acid are then gradually introduced over the course of ½ hour while this temperature is maintained. The procedure of Example 1 is then followed. A precipitate of ω-nitroacetophenone oxime is obtained.

This oxime is hydrolysed as in Example 1 and 24.7 g. of ω-nitroacetophenone are obtained.

EXAMPLE 3

10.4 g. of styrene, 68 g. of water, 120 g. of tertiary butyl alcohol and 12 g. of sulphuric acid (66° Baumé) are introduced into the apparatus described in Example 1. A solution of 13.6 g. of sodium nitrite in 38 g. of water is gradually introduced over the course of 1 hour into the reaction mixture which is kept at a temperature of 10° C. The procedure of Example 1 is then followed. A precipitate of ω-nitroacetophenone oxime is obtained.

This oxime is hydrolysed as in Example 1. 10.4 g. of ω-nitroacetophenone are obtained.

EXAMPLES 4 TO 12

A series of experiments is carried out following the working method described below, the particular conditions and the results obtained being indicated in the Table below. Styrene, water, an organic solvent and sodium nitrite are introduced into the apparatus described in Example 1. The mixture is cooled to the indicated temperature which is maintained throughout the reaction. During this reaction, 25% by weight sulphuric acid is gradually introduced. The reaction mixture is then allowed to return to about 20° C. If insoluble matter is present, the mixture is filtered. The organic solvent is evaporated by distillation at ambient temperature under reduced temperature, causing the ω-nitroacetophenone oxime to precipitate. The aqueous phase is removed by decantation. 25% by weight sulphuric acid is added and the mixture is heated for 1 hour at 85° C. while stirring, cooled and filtered. ω-Nitroacetophenone is thus isolated.

TABLE

| Example | Solvent Nature | Amount in g. | Styrene in g. | Water in g. | Nitrite in g. | Temperature in °C. | Duration of reaction in minutes | Amount in g. of 25% sulphuric acid used To liberate HNO² | For the hydrolysis | Amount of nitroketone in g. |
|---|---|---|---|---|---|---|---|---|---|---|
| 4 | p-Dioxane | 120 | 10.4 | 75 | 13.8 | 0 | 30 | 43.1 | 144 | 10.6 |
| 5 | Methyl acetate | 108 | 10.4 | 75 | 13.8 | 0 | 45 | 43.1 | 136 | 11.3 |
| 6 | Ethyl acetate | 108 | 10.4 | 75 | 13.8 | -1 | 60 | 43.1 | 144 | 6.15 |
| 7 | Methyl ethyl ketone | 108 | 10.4 | 75 | 13.8 | 0 | 60 | 43.1 | 140 | 11.5 |
| 8 | Diethyl ketone | 108 | 10.4 | 75 | 13.8 | 0 | 60 | 43.1 | 127 | 8.55 |
| 9 | Tertiary amyl alcohol | 108 | 10.4 | 75 | 13.8 | 0 | 55 | 43.1 | 144 | 12.0 |
| 10 | Nitromethane | 120 | 10.4 | 75 | 13.8 | -1 | 55 | 43.1 | 100 | 4.5 |
| 11 | Butyronitrile | 56 | 5.2 | 37.7 | 6.9 | 0 | 55 | 21.4 | 136 | 3.5 |
| 12 | Ethyl alcohol | 108 | 10.4 | 75 | 13.8 | -2 | 60 | 43.1 | 144 | 11.45 |

EXAMPLE 13

10.4 g. of styrene, 75 g. of water, 108 g. of hexamethylphosphotriamide (HMPT) and 13.8 g. of sodium nitrite are introduced into the apparatus described in Example 1. The mixture is cooled to 0° C. and 43.1 g. of 25% by weight sulphuric acid are then introduced gradually over the course of 55 minutes while this temperature is maintained. The reaction mixture is allowed to return to about 20° C. The nitroxime is extracted from this mixture with diethyl ether (5 portions of 200 cm.³ each). The ether fractions are combined and form a solution of ω-nitroacetophenone oxime in ether.

144 g. of 25% by weight aqueous sulphuric acid are added to this solution, and the ether is then removed by distillation at ambient temperature under reduced pressure, causing the oxime to precipitate. The reaction mixture is then heated for 1 hour at 85° C. with stirring. After cooling and filtering, 11.9 g. of ω-nitroacetophenone are isolated.

EXAMPLE 14

10.4 g. of styrene, 75 g. of water, 106 g. of dimethylformamide (DMF) and 13.8 g. of sodium nitrite are introduced into the apparatus described in Example 1.

The mixture is cooled to 0° C. and 41.2 g. of 25% by weight sulphuric acid are introduced gradually over the course of 30 minutes while this temperature is maintained. The reaction mixture is allowed to return to about 20° C. The nitroxime is extracted from this mixture with diethyl ether (5 portions of 100 cm.³). The ether fractions are combined, forming a solution of ω-nitroacetophenone oxime in ether.

140 g. of 25% by weight aqueous sulphuric acid are added to this solution, and the ether is then removed by distillation, causing the oxime to precipitate. The reaction mixture is then heated for 1 hour at 85° C. with stirring. After cooling and filtering, 10.8 g. of ω-nitroacetophenone are obtained.

EXAMPLE 15

Example 1 is repeated, replacing the acetone by the tetrahydrofuran (THF). 10.35 g. of ω-nitroacetophenone are isolated.

EXAMPLE 16

10.4 g. of styrene, 68 g. of water, 120 g. of dimethylsulphoxide (DMSO) and 12 g. of sulphuric acid (66° Baumé) are introduced into the apparatus described in Example 1. The mixture is cooled to 10° C. and a solution of 13.8 g. of sodium nitrite in 38 g. of water is then gradually introduced in 1 hour while this temperature is maintained. The reaction mixture is then allowed to return to about 20° C. and sulphuric acid (66° Baumé) is added in such amount that the weight ratio of sulphuric acid/(sulphuric acid+water) in the reaction mixture is 25%.

The ω-nitroacetophenone oxime is kept in solution and heated for 45 minutes at 90° C. with stirring. After cooling and filtering, 8.1 g. of ω-nitroacetophenone are isolated.

We claim:

1. Process for the preparation of a nitroxime of the formula:

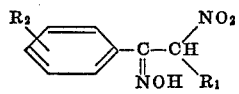

in which $R_1$ is a hydrogen atom, a hydrocarbon radical of 1 to 6 carbon atoms, a pyridyl, thienyl, thenyl or furyl radical, a nitrile radical or a hydroxy carbonyl or hydroxysulphonyl radical, and the symbol $R_2$, which may be the same as $R_1$ or different, can also be a halogen atom or an alkoxy group of 1–4 carbon atoms or a phenoxy or nitro radical, which comprises reacting at a temperature of −20° C. to +50° C. nitrogen sesquioxide, nitrous acid, a mixture of nitrogen monoxide and nitrogen dioxide in which the molar ratio of monoxide to dioxide is at least equal to 1:1 or a mixture of oxygen and nitrogen monoxide in which the molar proportion of monoxide to oxygen is at least 4:1 with a compound of the formula:

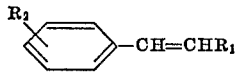

in a reaction medium containing 5–80% by weight water and a solvent having a solubility in water of more than 5% by weight which is a dialkylketone of 1 to 4 carbon atoms in each alkyl, an alkano-nitrile of 2 to 5 carbon atoms, an alkanol of 1 to 6 carbon atoms, a dialkyl ether of 1 to 4 carbon atoms in each alkyl, a dialkyl sulphoxide of 1 to 4 carbon atoms in each alkyl, an N,N-dialkyl alkanoamide of 1 to 4 carbon atoms in each alkyl and in the alkanoic residue, an alkyl alkanoate of 1 to 4 carbon atoms in each alkyl and alkanoic residue, a nitro-alkane of 1 to 4 carbon atoms, a hexa-alkylphosotriamide of 1 to 4 carbons in each alkyl, an ethylene glycol mono- or dialkyl ether of 1 to 4 carbons in each alkyl, p-dioxane, or tetrahydrofuran.

2. Process according to claim 1 in which $R_1$ is hydrogen or alkyl of 1 to 4 carbon atoms, and $R_2$ is hydrogen, halogen, nitro, cyano, alkyl of 1 to 4 carbon atoms, or alkoxy of 1 to 4 carbn atoms.

3. Prcess according to claim 1 in which $R_1$ and $R_2$ are both hydrogen.

4. Process according to claim 1 in which the nitrosation is effected with aqueous nitrous acid.

5. Process according to claim 1 in which the solvent is a dailkyl ketone of 1 to 4 carbon atoms in each alkyl, an alkano-nitrile of 2 to 5 carbon atoms, an alkanol or 1 to 6 carbon atoms, a dialkyl ether of 1 to 4 carbon atoms in each alkyl, a dialkyl sulphoxide of 1 to 4 carbon atoms in each alkyl, an N,N-dialkyl alkanoamide of 1 to 4 carbon atoms in each alkyl and in the alkanoic residue, an alkyl alkanoate of 1 to 4 carbon atoms in each alkyl and alkanoic residue, a nitro-alkane of 1 to 4 carbon atoms, a hexa-alkylphosphorotriamide of 1 to 4 carbons in each alkyl, an ethylene glycol mono- or di-alkyl ether of 1 to 4 carbons in each alkyl, p-dioxane, or tetrahydrofuran.

6. Process according to claim 5 in which the said solvent is acetone, acetonitrile, t-butanol, p-dioxane, methyl acetate, ethyl acetate, methyl ethyl ketone, diethyl ketone, t-amyl alcohol, nitromethane, butyronitrile, ethanol, hexamethylphosphotriamide, dimethylformamide, tetrahydrofuran, or dimethylsulphoxide.

References Cited

UNITED STATES PATENTS 3,267,143  8/1966  Nenz et al. _____ 260—566
3,346,523  10/1967  Wiese _____ 260—566 X

OTHER REFERENCES

Migrdichian, "Organic Synthesis," vol. 1, pp. 693 (1957).

BERNARD HELFIN, Primary Examiner

G. A. SCHWARTZ, Assistant Examiner

U.S. Cl. X.R.

260—294.8 B, 294.8 D, 294.8 F, 294.9, 296 D, 296 M, 329 S, 329 AM, 332.3 R 332.3 H, 332.5, 347.2, 347.7, 465 E, 469, 471 A, 508, 592, 297 R, 347.8, 465 R, 465 G, 465 H 476 R, 511; 208—17